(12) United States Patent
Gilbreath et al.

(10) Patent No.: US 10,514,120 B2
(45) Date of Patent: Dec. 24, 2019

(54) HIGH PRESSURE, LARGE INNER DIAMETER HOSE COUPLING WITH TERMINATION ATTACHMENT

(71) Applicant: GATES CORPORATION, Denver, CO (US)

(72) Inventors: Donald R Gilbreath, Castle Rock, CO (US); Ron Trujillo, Highlands Ranch, CO (US); Rudy Braun, Littleton, CO (US); Charles Gray, Parker, CO (US); Karlton Wolf, Chardon, OH (US)

(73) Assignee: Gates Corporation, Denver, CO (US)

( * ) Notice: Subject to any disclaimer, the term of this patent is extended or adjusted under 35 U.S.C. 154(b) by 1464 days.

(21) Appl. No.: 14/252,741

(22) Filed: Apr. 14, 2014

(65) Prior Publication Data
US 2015/0292661 A1 Oct. 15, 2015

(51) Int. Cl.
*F16L 33/01* (2006.01)
*F16L 33/207* (2006.01)
*F16L 33/213* (2006.01)

(52) U.S. Cl.
CPC ........... *F16L 33/01* (2013.01); *F16L 33/2073* (2013.01); *F16L 33/213* (2013.01); *F16L 2201/10* (2013.01)

(58) Field of Classification Search
CPC .................................................. F16L 33/223
USPC ....... 285/256, 382, 242, 222.1–222.5, 382.4, 285/382.7
See application file for complete search history.

(56) References Cited

U.S. PATENT DOCUMENTS

| 1,440,508 | A | * | 1/1923 | Todd | F16L 33/26 138/127 |
| 1,539,327 | A | * | 5/1925 | Phillips | F16L 33/224 285/222.2 |
| 1,808,101 | A | * | 6/1931 | Eastman | F16L 33/207 285/256 |

(Continued)

FOREIGN PATENT DOCUMENTS

| CN | 201739676 U | 2/2011 |
| DE | 29713845 U1 | 2/1997 |

(Continued)

OTHER PUBLICATIONS

European Patent Office, Invitation to Pay Additional Fees and, Where Applicable, Protest Fee, International Application No. PCT/US2015/023660, dated Jun. 5, 2015, 6 pages.

(Continued)

*Primary Examiner* — Anna M Momper
*Assistant Examiner* — Fannie C Kee
(74) *Attorney, Agent, or Firm* — Paul N. Dunlap, Esq.

(57) ABSTRACT

A hose coupling for attachment to an end portion of a hose. The hose coupling may include a fitting, a termination attachment, and an end termination. The fitting may be attachable to the end portion of the hose. The fitting may include a ferrule and a stem. The ferrule may be attached to the stem. The termination attachment may be attached to the fitting in opposing relationship to the end portion of the hose. The end termination may be associated with the termination attachment. In some examples, the end termination is threaded, welded, integrally formed, integrally machined, or otherwise associated with the termination attachment.

24 Claims, 9 Drawing Sheets

(56) References Cited

U.S. PATENT DOCUMENTS

| | | | | |
|---|---|---|---|---|
| 2,017,362 A | * | 10/1935 | Werder | F16L 19/0206 285/148.16 |
| 2,319,586 A | | 5/1943 | Clench | |
| 2,328,298 A | * | 8/1943 | Santhoff | F16L 33/224 285/222.1 |
| 2,375,614 A | | 5/1945 | Berger et al. | |
| 2,525,616 A | * | 10/1950 | Peeps | F16L 33/224 285/247 |
| 3,140,106 A | * | 7/1964 | Thomas | F16L 33/01 285/222.4 |
| 3,224,794 A | * | 12/1965 | Crissy | F16L 33/2076 285/243 |
| 3,237,974 A | * | 3/1966 | Press | F16L 33/2073 285/222.4 |
| 3,314,696 A | * | 4/1967 | Ferguson | F16L 37/088 24/665 |
| 3,630,548 A | | 12/1971 | Kimm et al. | |
| 3,752,506 A | * | 8/1973 | Fouts | F16L 27/0816 285/179 |
| 3,866,679 A | * | 2/1975 | Laky | E21B 19/22 |
| 3,936,118 A | * | 2/1976 | Thiery | F16L 33/01 439/191 |
| 3,999,781 A | * | 12/1976 | Todd | F16L 15/008 285/12 |
| 4,353,581 A | * | 10/1982 | Eisenzimmer | F16L 33/34 285/222.4 |
| 4,666,191 A | * | 5/1987 | Sotelo | F16L 33/01 285/222.2 |
| 5,456,614 A | * | 10/1995 | Szegda | H01R 9/0521 285/256 |
| 5,788,292 A | * | 8/1998 | Korner | F16L 33/22 285/256 |
| 6,318,763 B1 | * | 11/2001 | Huang | F16L 33/2078 285/256 |
| 2004/0032124 A1 | | 2/2004 | Lefere et al. | |
| 2009/0295154 A1 | | 12/2009 | Weil et al. | |
| 2011/0309613 A1 | | 12/2011 | Trujillo et al. | |
| 2012/0060959 A1 | | 3/2012 | Dianetti et al. | |

FOREIGN PATENT DOCUMENTS

| | | | | |
|---|---|---|---|---|
| DE | 10214997 A1 | | 10/2003 | |
| EP | 0612951 A1 | * | 8/1994 | F16L 37/144 |
| JP | H09079461 A | | 3/1997 | |
| RU | 11858 U1 | | 11/1999 | |
| WO | 2010129504 A1 | | 11/2010 | |

OTHER PUBLICATIONS

European Patent Office, International Search Report application No. PCT/US2015/023660, dated Aug. 28, 2015, 7 pages.

State Intellectual Property Office of the People's Republic of China, Notification of the First Office Action, Chinese application No. 201580026025.1, dated Jan. 29, 2018.

* cited by examiner

HIGH PRESSURE, LARGE INNER DIAMETER HOSE COUPLING WITH TERMINATION ATTACHMENT

BACKGROUND

1. Field

The present disclosure relates generally to couplings used in oil field and other applications, and more particularly to a high pressure, large inner diameter hose coupling with a termination attachment.

2. Related Art

Large diameter, high pressure hoses (such as those used in oil field applications) typically are attached together with large diameter, mating end terminations (such as flanges, male hammer unions, hubs, and the like). Each end termination generally is attached to a respective hose by a hose-end fitting. The hose-end fittings conventionally are built-in or swaged to the hose.

Built-in fittings generally are attached to a respective hose prior to curing the hose, resulting in a custom manufacturing process that begins upon receipt of a customer order. For instance, upon receiving an order, the manufacturing facility generally manufactures a hose to length, bonds the fittings to the ends of the made-to-length hose, and then cures the assembled hose and fittings. Manufacturing facilities generally experience delays due to the labor-intensive process, the need to schedule a hose build after receiving the customer order, and an inability to utilize a cut and couple system. This results in long lead times for customer orders.

Swage fittings generally are attached to a previously-cured hose, resulting in a faster manufacturing process relative to built-in fittings. For instance, prior to receiving a customer order, hoses generally are cured in long lengths and then stored alongside various types of fittings. Upon receiving a customer order, a cured hose is cut to the proper length, and then the swage fittings are attached to the ends of the cut-to-length, cured hose. Despite the benefits, swage fittings have several drawbacks.

In some circumstances, the end terminations are welded to the hose-end fitting before the fitting is swaged to the hose. However, due at least in part to the large size of the end terminations, swaging dies must be removed from the swaging equipment to allow removal of the swaged hose assembly from the equipment, thereby increasing the complexity and time of the swaging operation. To address this issue, in some circumstances, the end terminations are welded to the hose-end fitting after the fitting is swaged to the hose. However, due to the proximity of the welding operation to the swaged end of the hose, the heat from the welding operation may damage the end of the hose, which may compromise the integrity of the swage connection. To mitigate the risk of heat damage, certain welding methods (such as water jacket welding) may be used, but these methods are difficult and potentially dangerous. The swage operation also generally requires the use of heavy dies. Additionally, due to the nature of the swage operation, the hose is first crushed at the end of the ferrule of the swage fitting, and then the hose is compressed such that it grows axially relative to the stem of the fitting, imparting shear forces through the thickness of the hose and often delaminating or otherwise damaging the hose.

SUMMARY

Examples of the disclosure may include a hose coupling for attachment to an end portion of a hose. The hose coupling may include a fitting, a termination attachment, and an end termination. The fitting may be attachable to the end portion of the hose. The fitting may include a ferrule and a stem. The ferrule may be attached to the stem. The termination attachment may be attached to the fitting in opposing relationship to the end portion of the hose. The end termination may be associated with the termination attachment. In some examples, the end termination is threaded, welded, integrally formed, or integrally machined with the termination attachment. The coupling may include a second ferrule attached to the termination attachment. The second ferrule may extend axially over the ferrule and may be spaced radially outwardly of the ferrule. The termination attachment may be a tubular structure that is threaded at one end and chamfered at an opposing end. The termination attachment may be a tubular structure that is threaded at one end and integrally-machined with the end termination at an opposing end.

The termination attachment may form a fluid-tight interface with the stem. The fluid-tight interface may include a first seal formed by sealing element sealed against opposing surfaces of the stem and the termination attachment. Additionally or alternatively, the fluid-tight interface may include a second seal formed between opposing tapered surfaces of the stem and the termination attachment. The tapered surfaces may be axially offset from the sealing element. For example, the tapered surfaces may be positioned axially-inward or axially-outward of the sealing element.

The termination attachment may be in threaded engagement with the fitting. For example, the termination attachment may be in threaded engagement with the stem or the ferrule. The termination attachment and the ferrule may include corresponding locking features to prevent the termination attachment from unthreading from the fitting. The locking feature of the termination attachment may include an annular locking groove, and the locking feature of the ferrule may include one or more through-holes axially aligned with the annular locking groove. One or more set screws may be received in the through-holes and may protrude into the annular locking groove.

In some examples, the hose coupling may include a unitary, one-piece stem, a unitary, one-piece ferrule, and a termination attachment. The unitary, one-piece stem may include a first end portion, a second end portion, and an intermediate portion disposed axially between the first and second end portions. The unitary, one-piece ferrule may include a first collar portion, a second collar portion, and an intermediate portion disposed axially between the first and second collar portions. The first collar portion may be disposed about the first end portion and may define a first annular space between the first end portion and the first collar portion. The second collar portion may be disposed about the second end portion and may define a second annular space between the second end portion and the second collar portion. The intermediate portion of the ferrule may be disposed about and attached to the intermediate portion of the stem. An end portion of a hose may be disposed in the first annular space. The termination attachment may be at least partially received within the second annular space. The termination attachment may be a nipple that is externally or internally threaded at one end and chamfered at an opposing end.

The termination attachment may form a fluid-tight interface with the second end portion of the stem. The fluid-tight interface may include a sealing element disposed about an outer surface of the second end portion of the stem and sealed against an inner surface of the termination attachment, and a tapered segment of the outer surface of the second end portion of the stem sealed against a tapered segment of the inner surface of the termination attachment. The respective tapered segments may be positioned axially-inward or outward of the sealing element along the respective outer and inner surfaces. In some examples, the sealing element may seal against an outer surface of the termination attachment and an inner surface of the stem.

The termination attachment may be attached to the second collar portion of the ferrule. The termination attachment may include an external thread, and the second collar portion of the ferrule may include an internal thread in threaded engagement with the external thread of the termination attachment. The intermediate portion of the stem may include an external thread, the intermediate portion of the ferrule may include an internal thread in threaded engagement with the external thread of the intermediate portion of the stem, and the internal thread of the intermediate portion of the ferrule may be continuous with the internal thread of the second collar portion.

The termination attachment and the second collar portion of the ferrule may include corresponding locking features to prevent the termination attachment from unthreading from the ferrule. The locking feature of the termination attachment may include an annular locking groove, and the locking feature of the second collar portion of the ferrule may include multiple through-holes that are axially aligned with one another and alignable with the annular locking groove. The through-holes of the second collar portion of the ferrule may be disposed axially between the internal thread of the second collar portion of the ferrule and an end face of the ferrule.

In another example, a hose-end fitting is provided. The hose-end fitting may include a stem, a sealing element, and a ferrule. The stem may include a first end portion insertable into an end portion of a hose. The sealing element may be arranged about the first end portion of the stem. The ferrule may be attached to the stem. The ferrule may include a first collar portion disposed about the first end portion and defining an annular space between the first end portion and the first collar portion. The first collar portion may include an annular, internal serration that is positioned axially inward of the sealing element to facilitate a fluid-tight interface between the sealing element and an end portion of a hose. The annular, internal serration may be axially separated from an adjacent annular, internal serration by a cylindrical segment. The first end portion of the stem may include a series of external, annular barbs spaced axially apart from one another, and the sealing element may be positioned axially between consecutive barbs of the series of external, annular barbs.

In another example, a method of attaching a hose coupling to a hose is provided. The method may include attaching a ferrule to a stem to form a hose-end fitting, inserting an end portion of a hose into an annular space defined between a portion of the ferrule and a portion of the stem, radially constricting the annular space to attach the fitting to the end portion of the hose, and, after attaching the fitting to the end portion of the hose, threadably engaging a termination attachment to the fitting in opposing relationship to the end portion of the hose. Radially constricting the annular space may compress a sealing element disposed about the stem against an inner surface of the hose to form a fluid-tight interface between the sealing element and the hose. The fitting may be non-rotatable relative to the end portion of the hose.

The method may further include forming a fluid-tight interface between opposing surfaces of the termination attachment and the stem during the threaded engagement of the termination attachment to the fitting. The method may further include rotating the termination attachment relative to the fitting until a marking on an outer surface of the termination attachment is aligned with an end face of the ferrule. The method may further include axially locking the termination attachment to the fitting to prevent unthreading of the termination attachment from the fitting.

In another example, a hose assembly is provided. The hose assembly may include a hose and a coupling. The hose may include an inner tube, a cable reinforcement layer surrounding the inner tube, and a cover layer surrounding the cable reinforcement layer. The coupling may be crimped or swaged on an end portion of the hose. The coupling may include a unitary ferrule, a unitary stem, a termination attachment, and an end termination. The unitary ferrule may be disposed over the end portion of the hose. The unitary stem may be disposed in the end portion of the hose. The stem may be attached to the ferrule. The termination attachment may be attached to the ferrule or the stem in opposing relationship to the end portion of the hose. The end termination may be associated with the termination attachment.

The termination attachment may be in threaded engagement with the ferrule or the stem. The termination attachment may form a fluid-tight interface with the stem. The coupling may further include a sealing element disposed about the stem and sealed against an inner surface of the inner tube. The ferrule may include an internal serration that is positioned axially inward of the sealing element to facilitate a fluid-tight interface between the sealing element and the inner surface of the inner tube. The end termination may be welded to or integrally-machined with the termination attachment. The inner tube may be at least partially skived along the end portion of the hose. The cover layer may be at least partially skived along the end portion of the hose.

This summary of the disclosure is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of examples, it should be appreciated that individual aspects of any example can be claimed separately or in combination with aspects and features of that example or any other example.

This summary is neither intended nor should it be construed as being representative of the full extent and scope of the present disclosure. The present disclosure is set forth in various levels of detail in this application and no limitation as to the scope of the claimed subject matter is intended by either the inclusion or non-inclusion of elements, components, or the like in this summary.

BRIEF DESCRIPTION OF THE DRAWINGS

The accompanying drawings, which are incorporated in and form part of the specification in which like numerals designate like parts, illustrate examples of the present disclosure and together with the description, serve to explain the principles of the disclosure.

DETAILED DESCRIPTION

The present disclosure generally relates to a hose coupling. The hose coupling may include two primary components: a hose-end fitting and a termination attachment. The hose-end fitting may be secured to an end of a hose, which may be used in high-pressure and/or high-temperature applications, such as oil field or other applications. In some implementations, the fitting is crimped to the end of the hose, producing considerably less damage to the hose relative to swaged fittings. The termination attachment may be secured to any desired end termination (e.g., large diameter connections such as flanges, male hammer unions, hubs, and the like). In some implementations, the termination attachment is threaded, welded, integrally formed, integrally machined, or otherwise associated with an end termination. After associating the termination attachment with the end termination, the termination attachment and the end termination may be attached to the end of the hose via the fitting.

The coupling may reduce the complexity and time of securing the end termination to an end of the hose, as well as reduce the likelihood of heat damage to the hose during assembly, thereby decreasing equipment downtime. In some implementations, the fitting is crimped or swaged to an end of the hose before the termination attachment and associated end termination are attached to the fitting. As such, the fitting may be positioned within the crimp or swage equipment, subsequently crimped or swaged to the end of the hose, and then the fitting and the end of the hose may be removed collectively from the equipment, without removing dies from the equipment. After the crimping or swaging operation, the termination attachment and associated end termination may be attached to the fitting in opposing relationship to the end of the hose, without a welding operation. In some examples, the coupling is attached to a hose having an internal diameter of between about 2 inches and about 4 inches.

Figure 1:
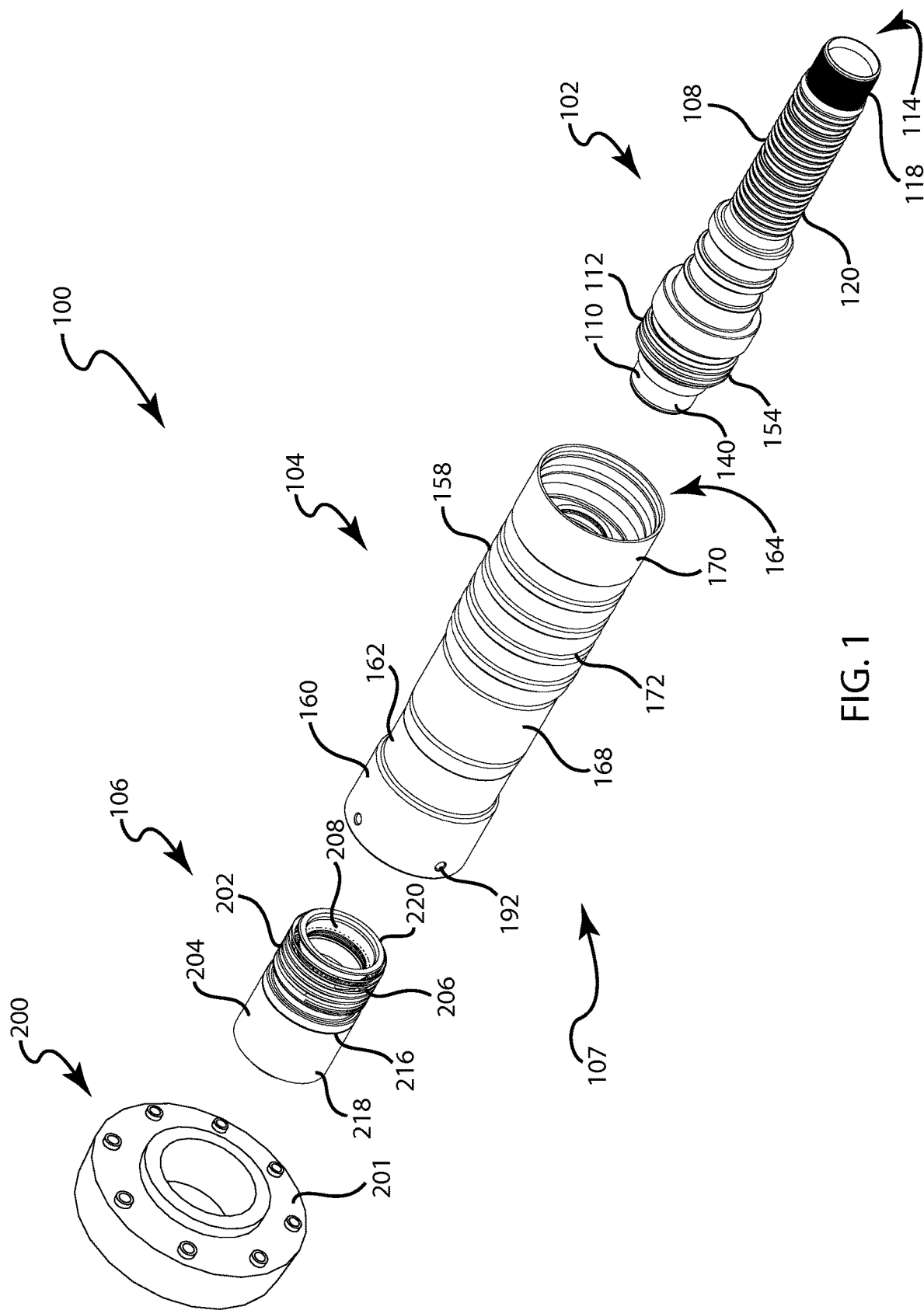
FIG. 1 is an exploded view of an example hose coupling, including a weld nipple and a flange end termination.

An exploded view of a coupling 100 is shown in FIG. 1. The coupling 100 may include a stem 102, a ferrule 104, and a termination attachment 106. The ferrule 104 may be threaded, staked, or otherwise attached to the stem 102 to form a hose-end fitting 107, which may be crimped, swaged, or otherwise attached to an end portion of a hose. The termination attachment 106 may be attached to the hose-end fitting 107 opposite the end portion of the hose.

Figure 2:
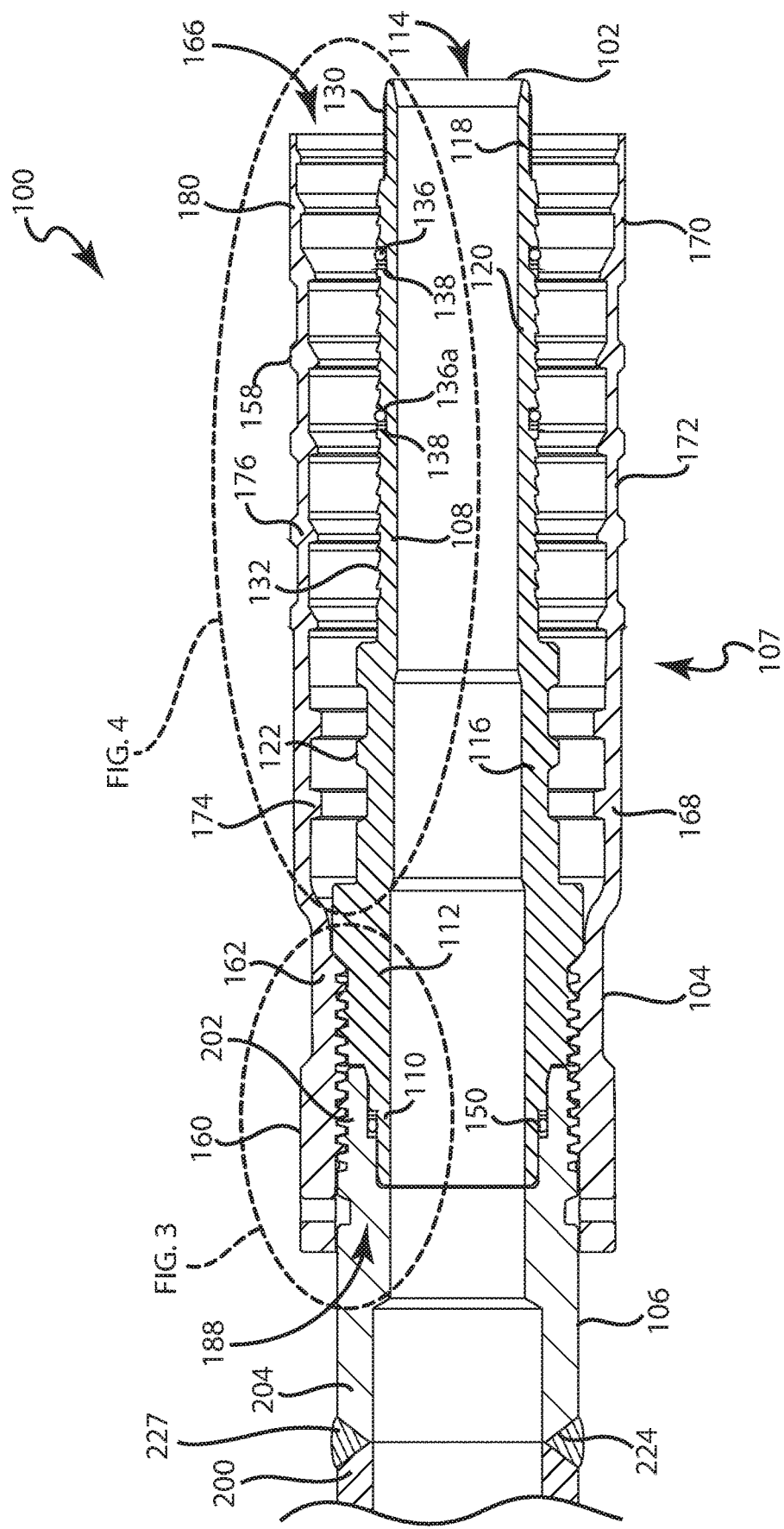
FIG. 2 is a longitudinal cross-section view of the hose coupling of FIG. 1 in accordance with some examples of the present disclosure.

Referring to FIGS. 1 and 2, the stem 102 may be formed as a unitary, one-piece tubular structure. The stem 102 may include a first end portion 108, a second end portion 110, and an intermediate portion 112 disposed axially between the first and second end portions 108, 110. The intermediate portion 112 may be contiguous with the first and second end portions 108, 110. The first end portion 108, the second end portion 110, and the intermediate portion 112 may be co-axially aligned along a longitudinal axis of the stem 102. The stem 102 may define a continuous internal bore 114 extending through the first end portion 108, the second end portion 110, and the intermediate portion 112 to facilitate fluid transmission through the fitting 107.

Figure 4:
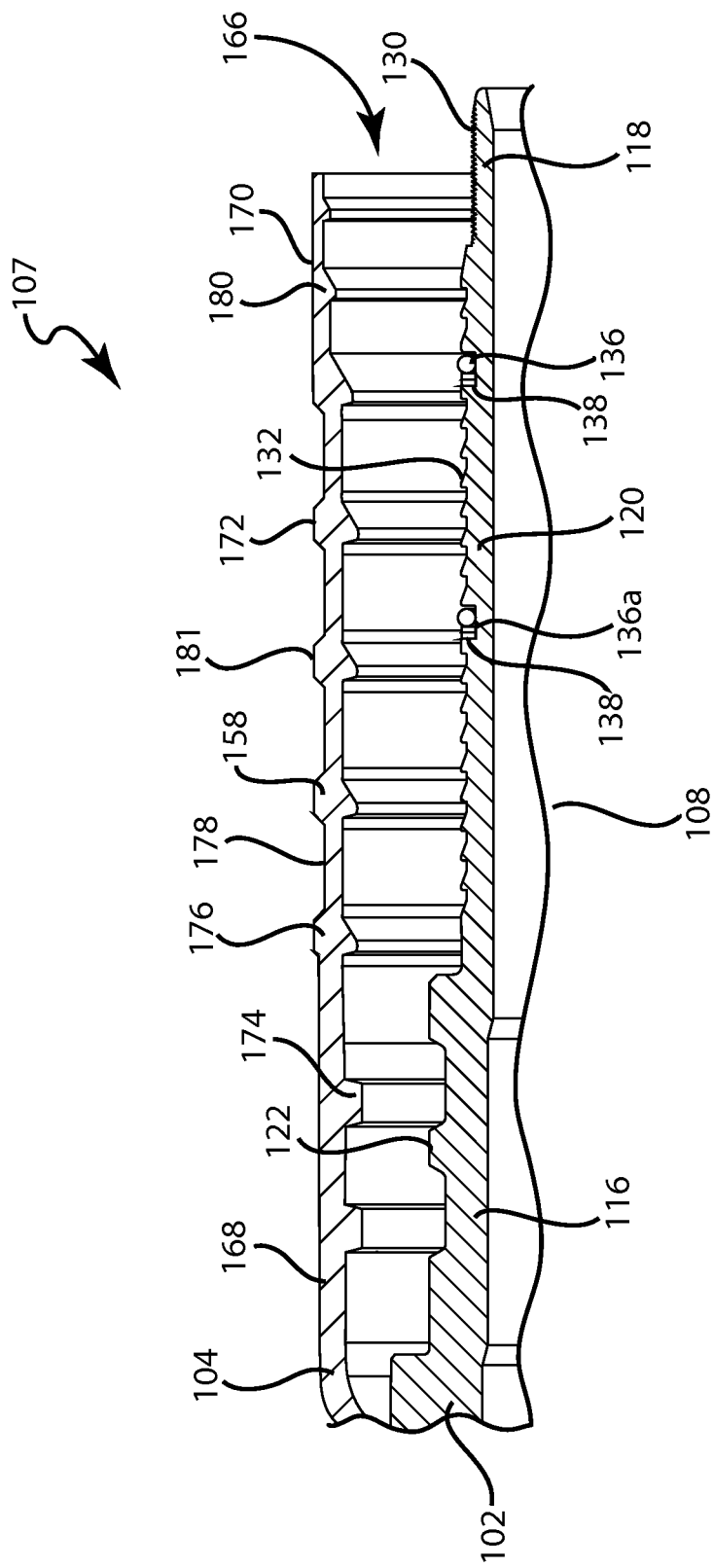
FIG. 4 is an enlarged, detail view of the hose coupling of FIG. 1 taken along the FIG. 4 detail line shown in FIG. 2 in accordance with some examples of the present disclosure.
Figure 5:
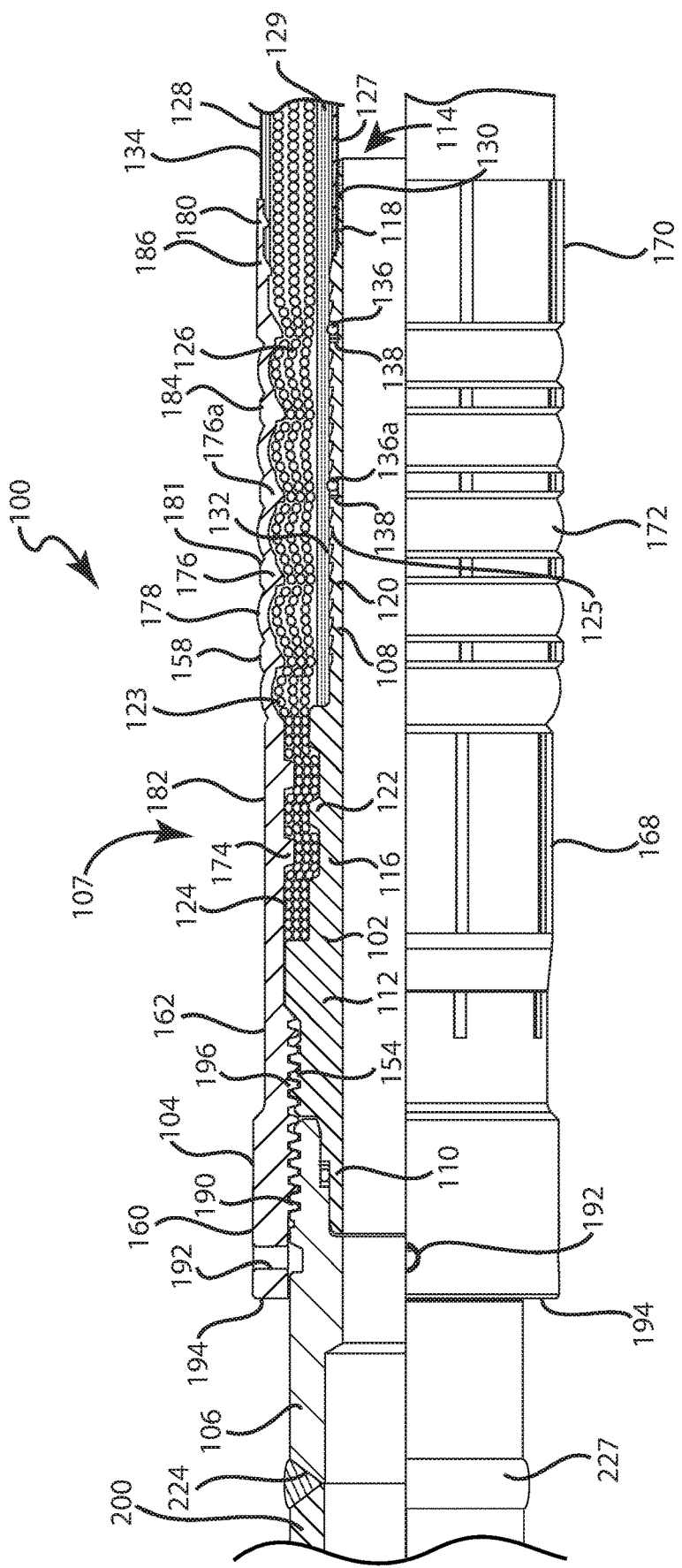
FIG. 5 is a generally quarter-sectioned, side view of the hose coupling of FIG. 1, with the coupling crimped onto a hose end in accordance with some examples of the present disclosure.

Referring to FIGS. 1, 2, 4, and 5, the first end portion 108 of the stem 102 may be engageable with an end portion of a hose 128 to form a fluid-tight interface with the hose 128. With reference to FIGS. 2 and 4, a first region 116 of the first end portion 108 may be contiguous with the intermediate portion 112 and may include one or more external, annular relatively-blunt ridges 122 spaced axially apart from one another. Referring to FIG. 5, the ridges 122 may engage a reinforcement layer 124 of the hose 128. The reinforcement layer 124 may include cables 123 (as shown in FIG. 5), wires, or other suitable reinforcing structures. Referring to FIGS. 2 and 4, a second region 120 may be contiguous with the first region 116 and may include a series of external, annular relatively-sharp barbs 132 spaced axially apart from one another. Referring to FIG. 5, the barbs 132 may engage an inner surface 125 of the hose 128. Referring to FIGS. 2 and 4, a third region 118 may be contiguous with the second region 120 and may include a gripping contour 130. Referring to FIG. 5, the gripping contour 130 may engage armor 127 disposed inside the hose 128 and capture the armor 127 between the stem 102 and the inner surface 125 of the hose 128. The armor 127 may be formed as a flexible metal conduit. In some implementations, the armor 127 has an outer diameter disposed within about 0.12 inches of the hose inner diameter. In some implementations, the armor 127 is formed of stainless steel.

The first end portion 108 of the stem 102 may include a sealing feature for sealing engagement with the inner surface 125 of the inner tube or tube portion 129 of the hose 128 to prevent or substantially prevent the ingress of fluid from the internal bore 114 of the stem 102 into the first region 116 of the stem 102. With reference to FIGS. 2, 4, and 5, one or more elastomeric sealing elements 136 (e.g., O-rings) may be disposed about the second region 120 of the stem 102. In FIGS. 2, 4, and 5, one or more sealing elements 136 may be disposed about the first end portion 108, with the axially-inwardly positioned sealing element 136 denoted by the reference numeral 136a for identification purposes. The sealing elements 136 may facilitate a sealing engagement with the tube portion 129 of the hose 128, which may be plastic. One or more back-up rings 138 may be disposed about the second region 120 of the first end portion 108 of the stem 102 in abutting relationship with an aft-side of the sealing elements 136. The back-up rings 138 may ensure the seals 136 remain in place along the second region 120 of the stem 102. The sealing elements 136 and the back-up rings 138 may be disposed in annular grooves formed in a periphery of the stem 102 between successive barbs 132.

Figure 3:
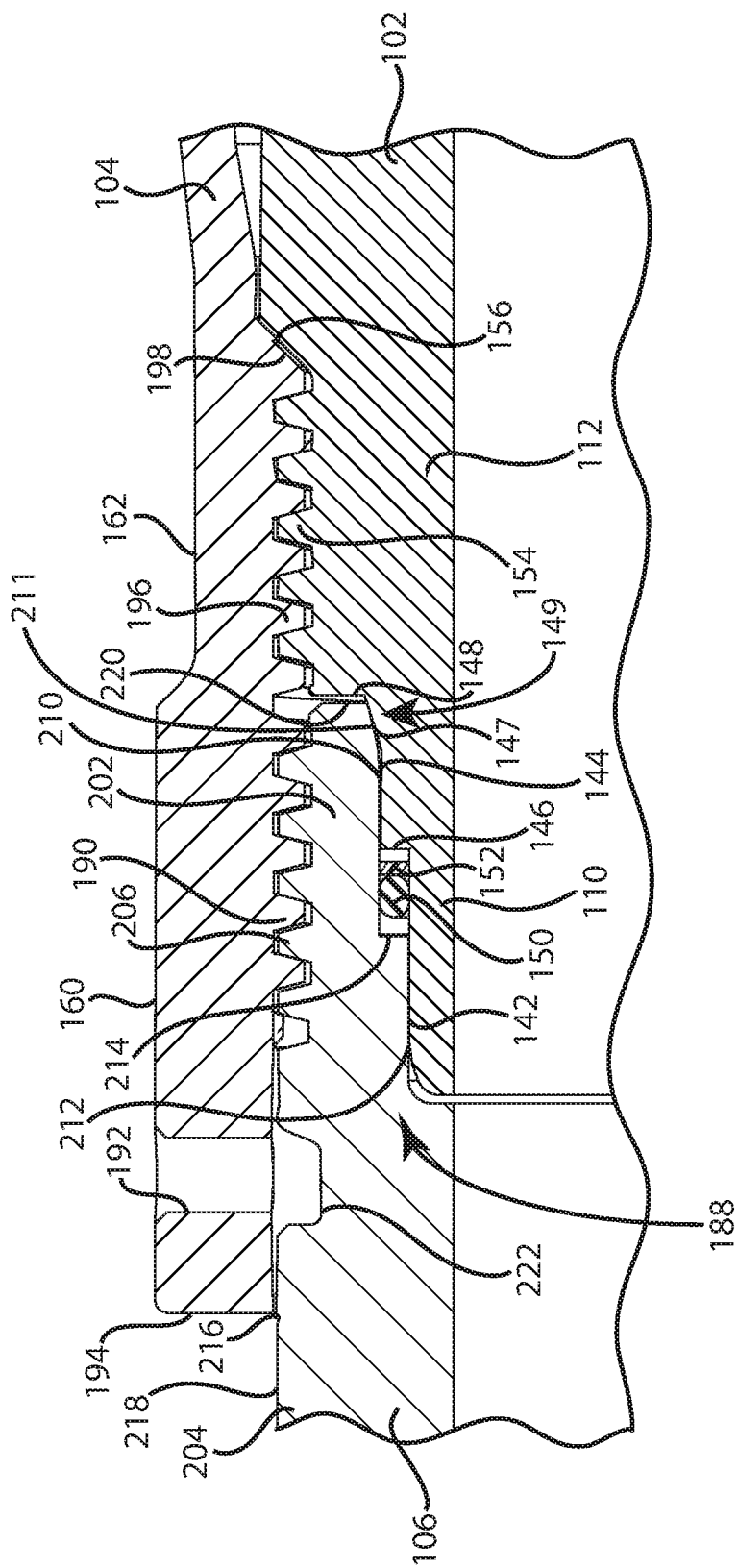
FIG. 3 is an enlarged, detail view of the hose coupling of FIG. 1 taken along the FIG. 3 detail line shown in FIG. 2 in accordance with some examples of the present disclosure.

Referring to FIGS. 1-3 and 5, the second end portion 110 of the stem 102 may be engageable with the termination attachment 106 to form a fluid-tight interface with the termination attachment 106. The second end portion 110 of the stem 102 may include a cylindrical or substantially cylindrical outer surface 140 that may define one or more stepped surfaces. With reference to FIG. 3, the outer surface 140 may include a first or leading surface 142, a second or trailing surface 144, and a first shoulder 146 disposed between the first and second surfaces 142, 144. The second surface 144 may have a larger outer diameter than the first surface 142. The first shoulder 146 may be formed as an annular shoulder oriented transversely (e.g., perpendicularly) to the first and second surfaces 142, 144 and may function as a seal stop. The first and second surfaces 142, 144 may be cylindrical or substantially cylindrical. The first surface 142 may include a rounded leading edge to facilitate alignment of the second end portion 110 with the termination attachment 106, to facilitate seal installation, or both. A tapered or angled surface 147 may be contiguous with the second surface 144. The angled surface 147 may form a fluid-tight interface with the termination attachment 106. In some implementations, the angled surface 147 forms a metal-to-metal seal with the termination attachment 106. The angled surface 147 may transition into a second shoulder 148. The second shoulder 148 may demarcate the second end portion 110 and the intermediate portion 112 of the stem 102.

With reference to FIGS. 2, 3, and 5, an elastomeric sealing element 150 (e.g., an O-ring) may be disposed about the first surface 142. Referring to FIG. 3, the sealing element 150 may form a sealing engagement with the stem 102 and the termination attachment 106 to prevent fluid leakage between the stem 102 and the termination attachment 106. The sealing element 150 may be retained on the stem 102 (see FIG. 3) or on the termination attachment 106. One or more back-up rings 152 may be disposed about the first surface 142 axially between and in abutment with the sealing element 150 and the first shoulder 146. In some implementations, the sealing element 150 is retained in a groove formed on the stem 102 or the termination attachment 106.

Referring to FIGS. 1-3 and 5, the intermediate portion 112 of the stem 102 may be engageable with a middle portion of the ferrule 104 to attach the ferrule 104 to the stem 102. The intermediate portion 112 may include an external thread 154 for threaded engagement with the ferrule 104. The external thread 154 may be a straight thread. Referring to FIG. 3, the external thread 154 may have a minor diameter that is larger than the outer diameter of the first and second surfaces 142, 144. The external thread 154 may be disposed axially between the second shoulder 148 and a third shoulder 156, which may function as a stop for the ferrule 104. The third shoulder 156 may extend outwardly from the minor diameter of the external thread 154 at an oblique angle, for example.

The ferrule 104 may be formed as a unitary, one-piece tubular structure. The ferrule 104 may include a first collar or shroud portion 158, a second collar or shroud portion 160, and an intermediate portion 162 disposed axially between the first and second collar portions 158, 160. The intermediate portion 162 may be contiguous with the first and second collar portions 158, 160. The first collar portion 158, the second collar portion 160, and the intermediate portion 162 may be co-axially aligned along a longitudinal axis of the ferrule 104. The ferrule 104 may define an internal bore 164 extending continuously through the first collar portion 158, the second collar portion 160, and the intermediate portion 162 for receiving the stem 102, the end portion 126 of the hose 128, and an end portion of the termination attachment 106.

Referring to FIGS. 2 and 4, the first collar portion 158 of the ferrule 104 may be disposed about the first end portion 108 of the stem 102 so as to define an annular space 166 radially between the first collar portion 158 and the first end portion 108. The first collar portion 158 may be arranged concentrically about and spaced radially-outwardly of the first end portion 108. The first collar portion 158 may be radially-inwardly contractible or crushable so as to secure the end portion 126 of the hose 128 between the first collar portion 158 and the first end portion 108. Additionally or alternatively, the first end portion 108 of the stem 102 may be radially-outwardly expandable so as to secure the end portion 126 of the hose 128 between the first collar portion 158 and the first end portion 108. Internally expanding the stem 102 may improve sealing and retention between the fitting 107 and the hose 128. For instance, internally expanding the stem 102 may assist in locking the armor 127 in place, in improving fitting retention, and in reducing hose damage since the ferrule 104 may be crimped to a larger diameter with the same level of retention.

Referring to FIGS. 1, 2, 4, and 5, the first collar portion 158 of the ferrule 104 may include a first region 168, a second region 170, and an intermediate region 172 disposed axially between the first and second regions 168, 170. The first region 168 may be contiguous with the intermediate portion 162 of the ferrule 104, and the second region 170 may be contiguous with a leading edge of the ferrule 104. With reference to FIGS. 2 and 4, the first region 168 may include one or more internal, annular, relatively-blunt ridges 174 spaced axially apart from one another. The intermediate region 172 may include a series of internal, annular serrations 176 axially separated from one another by a series of cylindrical or substantially cylindrical segments 178. The second region 170 may include multiple internal, annular projections 180 spaced axially apart from one another.

Referring to FIGS. 2 and 4, the cylindrical segments 178 may be formed as recesses in the exterior or outer surface of the ferrule 104. The cylindrical segments 178 may be located axially between external ridges 181 of the ferrule 104. When the ferrule 104 is crimped, the external ridges 181 may be pushed radially inwardly and a middle portion of the cylindrical segments 178 may remain at a larger diameter, resulting in the cylindrical segments 178 forming an arched or curved bulge between the external ridges 181 (see FIG. 5). The cylindrical segments 178 may reduce the axial growth of the ferrule 104 and may reduce the crimp force needed to attach the fitting 107 to the hose 128, since the cylindrical segments 178 are not constricted radially as much as the external ridges 181.

Referring to FIG. 5, the first and intermediate regions 168, 172 of the ferrule 104 may engage the reinforcement layer 124 of the hose 128, and the second region 170 of the ferrule 104 may engage the cover layer or portion 134 of the hose 128. The internal ridges 174 of first region 168 of the ferrule 104 may interdigitate or interlock with the external ridges 122 of the first region 116 of the stem 102 to axially secure the hose 128 within a first zone 182 of the hose-end fitting 107. Within the first zone 182, the reinforcement layer 124 of the hose 128 may be gripped internally and externally by the axially offset ridges 122, 174 of the stem 102 and the ferrule 104, respectively. The ridges 122, 174 may have axial lengths sufficient to bite or grip the reinforcement layer 124 without creating a stress riser that causes the reinforcement layer 124 to break or snap. The interdigitated ridges 122, 174 may move the reinforcement layer 124 into radially-opposing grooves formed axially between the respective ridges 122, 174, thereby moving the reinforcement layer 124 into a substantially sinusoidal shape and providing a mechanical interlock. The offset ridges 122, 174 may provide the primary gripping or retention of the hose 128.

The internal serrations 176 of the intermediate region 172 of the ferrule 104 may generally radially oppose the annular barbs 132 of the second region 120 of the stem 102 to axially secure the hose 128 within a second zone 184 of the hose-end fitting 107. The internal serrations 176 may bite into the hose reinforcement layer 124, provide compression to the hose 128 for sealing, or both. The internal projections 180 of the second region 170 of the ferrule 104 may engage the cover portion 134 of the hose 128 to prevent or substantially prevent the cover 134 from bulging. The second region 170 may generally radially oppose the second region 120 of the stem 102, the third region 118 of the stem 102, or both and define a third zone 186 of the hose-end fitting 107. When engaged with the end portion 126 of the hose 128, the hose-end fitting 107 may be capable of withstanding an internal hose operating pressure in excess of 10,000 pounds-force per square inch (PSI), without leakage.

The first collar portion 158 of the ferrule 104 may facilitate the sealing engagement between the one or more elastomeric sealing elements 136 and the hose 128. With reference to FIG. 5, when the hose-end fitting 107 is secured to the end portion 126 of the hose 128, one of the internal serrations 176 of the intermediate region 172 of the ferrule 104 may compress the inner surface 125 of the hose 128 against one of the elastomeric sealing elements 136. As shown in FIG. 5, an internal serration 176a may be axially aligned or substantially axially aligned with the axially-inward sealing element 136a. In some implementations, the internal serration 176a may be axially offset from, and positioned opposite the pressure side of, the axially-inward sealing element 136a (to the left of the sealing element 136a in FIG. 5) to facilitate a sealing engagement of the inner surface 125 of the hose 128 with the sealing element 136a.

With reference to FIGS. 2 and 3, the second collar portion 160 of the ferrule 104 may be disposed about the second end portion 110 of the stem 102 so as to define an annular space 188 radially between the second collar portion 160 and the second end portion 110. The second collar portion 160 may be arranged concentrically about and spaced radially-outwardly of the second end portion 110.

Referring to FIGS. 2, 3, and 5, the second collar portion 160 of the ferrule 104 may include an attachment feature, such as an internal thread 190. The second collar portion 160 may include a locking feature, such as one or more through-holes 192 spaced around a periphery of the second collar portion 160 and axially aligned with one another. The through-holes 192 may be internally threaded and may be disposed axially between an end face 194 of the ferrule 104 and the internal thread 190. The locking feature may prevent or substantially prevent rotation of the termination attachment 106 relative to the fitting 107 to maintain a metal-to-metal seal between the termination attachment 106 and the fitting 107. In some implementations, spot welds are used to secure the termination attachment 106 to the fitting 107.

Referring to FIGS. 2, 3, and 5, the intermediate portion 162 of the ferrule 104 may be disposed about the intermediate portion 112 of the stem 102. The intermediate portion 162 may be arranged concentrically about and attached to the intermediate portion 112. With reference to FIGS. 2 and 3, the intermediate portion 162 may include an internal thread 196, which may be continuous with the internal thread 190 of the second collar portion 162 of the ferrule 104. The internal threads 190, 196 may be straight threads. The internal thread 196 of the intermediate portion 162 of the ferrule 104 may threadably engage the external thread 154 of the intermediate portion 112 of the stem 102. A leading edge 198 of the internal thread 196 may abut against the third shoulder 156 of the stem 102 upon full engagement of the internal thread 196 of the ferrule 104 and the external thread 154 of the stem 102.

Referring to FIGS. 1 and 2, the termination attachment 106 may be formed as a tubular structure. The termination attachment 106 may be partially disposed about the second end portion 110 of the stem 102 and within the second collar portion 160 of the ferrule 104. The termination attachment 106 may sealingly engage the stem 102, and the termination attachment 106 may be attached to the ferrule 104. As shown in FIGS. 1 and 2, the termination attachment 106 may be threaded at one end for threaded attachment with the hose-end fitting 107. The termination attachment 106 may be chamfered at an opposing end for welded attachment with an end termination 200, such as a flange 201, a hammer union, or other suitable connections. In the depicted example, the termination attachment 106 may be referred to as a weld nipple. In some examples, the termination attachment 106 may be integrally formed or machined as a single structure with the end termination 200.

The termination attachment 106 may include a first end portion 202 and a second end portion 204. The first end portion 202 may be at least partially received within the annular space 188 defined between the second collar portion 160 of the ferrule 104 and the second end portion 110 of the stem 102. The second end portion 204 of the termination attachment 106 may be disposed at least partially beyond the end face 194 of the ferrule 104.

The first end portion 202 of the termination attachment 106 may be threadably attached to the ferrule 104. The first end portion 202 may include an external thread 206 that threadably engages the internal thread 190 of the second collar portion 160 of the ferrule 104, thereby enabling the termination attachment 106 to be attached to the hose-end fitting 107 after attachment of the stem 102 and the ferrule 104 to the end portion 126 of the hose 128. The threaded engagement between the termination attachment 106 and the ferrule 104 may provide a mechanical advantage to draw the termination attachment 106 to the ferrule 104 for connection, as well as to form a fluid-tight seal with the stem 102.

The first end portion 202 of the termination attachment 106 may be engageable with the second end portion 110 of the stem 102 to form a fluid-tight interface with the stem 102. Referring to FIGS. 1 and 3, the first end portion 202 may include a cylindrical or substantially cylindrical inner surface 208 that may define one or more stepped surfaces. The inner surface 208 may include a first or leading surface 210, a second or trailing surface 212, and a radial shoulder 214 disposed between the first and second surfaces 210, 212. The first surface 210 may have a larger inner diameter than the second surface 212. The radial shoulder 214 may be oriented transversely (e.g., perpendicularly) to the first and second surfaces 210, 212.

The sealing element 150 may contact opposing surfaces 142, 210 of the stem 102 and the termination attachment 106, respectively, to provide a fluid-tight interface between the stem 102 and the termination attachment 106. The first surface 210 may radially oppose the second surface 144 of the of the stem 102 and may be disposed sufficiently close to the second surface 144 to prevent the sealing element 150 from being displaced or extruded between the surfaces 144, 210 due to a positive internal fluid pressure of the hose 128. The one or more back-up rings 152 may assist in preventing the sealing element 150 from being displaced or extruded between the surfaces 144, 210. The second surface 212 may radially oppose the first surface 142 of the stem 102 and may be disposed sufficiently close to the first surface 142 to prevent the sealing element 150 from being displaced or extruded between the surfaces 142, 212 due to a vacuum or negative pressure in the hose 128.

Figure 7:
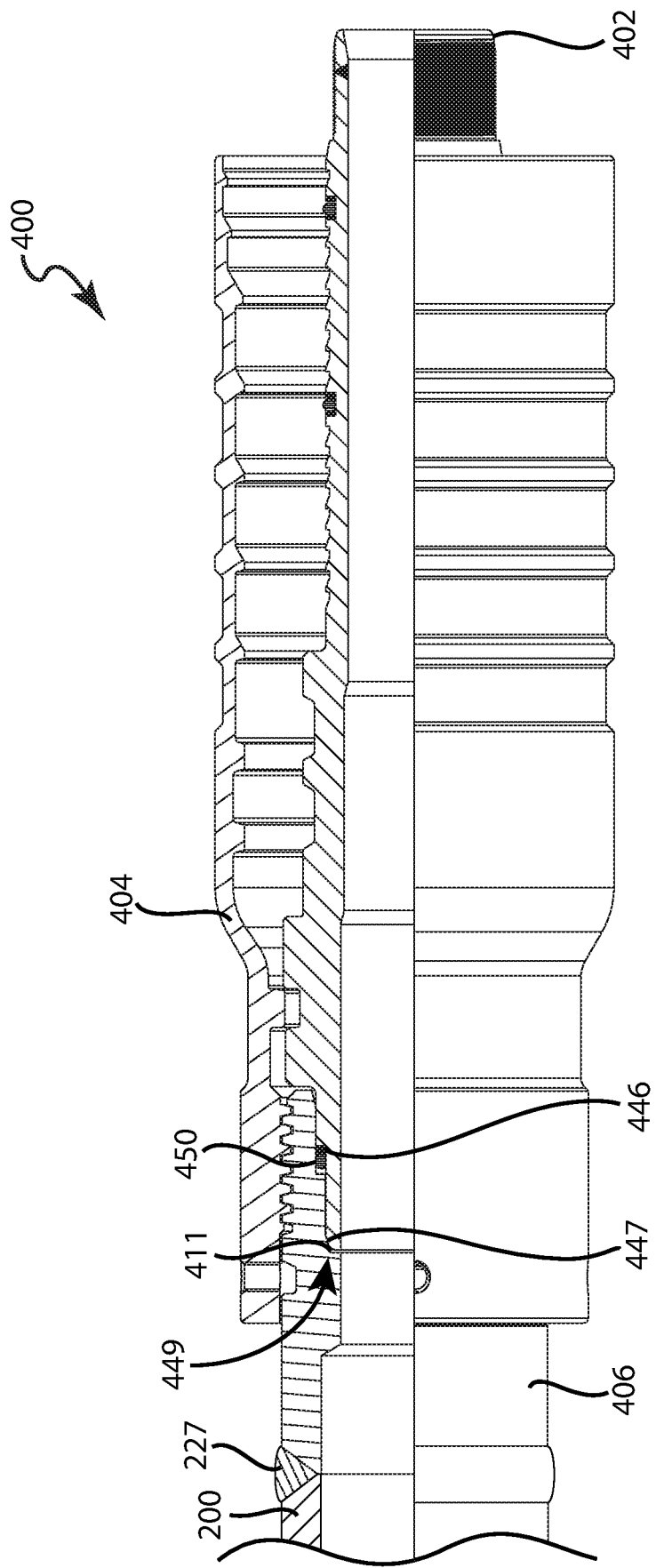
FIG. 7 is a longitudinal cross-section view of another example hose coupling in accordance with some examples of the present disclosure.

A tapered or angled surface 211 may be contiguous with the first surface 210 of the termination attachment 106. The angled surface 211 may form a fluid-tight interface with the stem 102. In some implementations, the angled surface 211 forms a metal-to-metal seal 149 with the angled surface 147 of the stem 102 (see FIG. 3). In these implementations, the interface between the termination attachment 106 and the stem 102 provides two fluid-tight seals: a first seal formed by the sealing element 150, and a second seal formed by the engagement of the angled surfaces 147, 211. The metal-to-metal seal 149 may be formed on either axial side of the sealing element 150. Referring to FIG. 3, the metal-to-metal seal 149 is formed rearwardly of the sealing element 150. Referring to FIG. 7, the metal-to-metal seal 449 is formed forwardly of the sealing element 450. The angled surface 211 may transition into a leading end face 220 of the termination attachment 106.

The termination attachment 106 may provide a visual indicator of a proper connection with the stem 102 and the ferrule 104. The visual indicator may be used as a safety indicator to indicate if the termination attachment 106 is fully engaged with the stem 102 and the ferrule 104. Referring to FIGS. 1 and 3, the termination attachment 106 may include an insertion marking 216 formed on the outer surface 218 of the termination attachment 106. The insertion marking 216 may be axially spaced from a leading end face 220 of the termination attachment 106 by a distance substantially corresponding to the axial length between the end face 194 of the ferrule 104 and the second shoulder 148 defining the transition between the second end portion 110 and the intermediate portion 112 of the stem 102. Axial alignment of the marking 216 with the end face 220 may indicate a sufficient sealed engagement between the termination attachment 106 and the stem 102. The insertion marking 216 may be a groove, ink, or other suitable marking. The insertion marking 216 may extend continuously or discontinuously around the outer surface 218 of the termination attachment 106. The insertion marking 216 may be annular to provide a visual indication of a proper connection from any viewing angle.

The termination attachment 106 may include a locking feature to axially secure the termination attachment 106 to the ferrule 104, thereby preventing the termination attachment 106 from unthreading from the ferrule 104 and providing a visual indication of a proper connection between the termination attachment 106, the ferrule 104, and the stem 102. Referring to FIG. 3, the locking feature may be an annular locking groove 222 formed in the outer surface 218 of the termination attachment 106. The annular locking groove 222 may be axially spaced from the leading end face 220 of the termination attachment 106 by a distance that ensures a sufficient seal is formed between the termination attachment 106 and the stem 102. Upon axial alignment of the annular locking groove 222 with the through-holes 192, set screws 215 (see FIG. 8, for example) may be inserted into the annular locking groove 222 to axially secure the termination attachment 106 to the ferrule 104.

Referring to FIGS. 2 and 5, the second end portion 204 of the termination attachment 106 may include a chamfer 224 to facilitate welding the end termination 200 (see weld 227 in FIGS. 2, 5 and 6) to the termination attachment 106. As previously noted, although a flange 201 is shown, other types of termination connections, such as hammer unions, hubs, and other suitable high-pressure connections, may be used. Thus, the termination attachment 106 may provide robustness in the field as any one of various types of end terminations may be welded to the termination attachment 106. After the end termination 200 is welded to the termination attachment 106, the end termination 200 and the associated termination attachment 106 may be threadably attached to the ferrule 104, thereby providing a fluid-tight seal with the stem 102. Alternatively, the termination attachment 106 may be integrally formed or machined with a desired end termination 200.

To assemble the hose coupling 100, the ferrule 104 may be aligned coaxially with the stem 102 and threaded onto the stem 102 until a leading edge 198 of the internal thread 196 of the intermediate portion 162 of the ferrule 104 abuts against the third shoulder 156 of the intermediate portion 112 of the stem 102. The end portion 126 of the hose 128 may be skived externally, internally, or both and slid into the annular space 166 defined radially between the first collar portion 158 of the ferrule 104 and the first end portion 108 of the stem 102. The first collar portion 158 of the ferrule 104 may be radially collapsed around the end portion 126 of the hose 128, the first end portion 108 of the stem 102 may be radially expanded by an axially-moveable plug disposed within the internal bore 114 of the stem 102, for example, or both to secure the stem 102 and the ferrule 104 to the end portion 126 of the hose 128.

After the stem 102 and the ferrule 104 are attached to the end portion 126 of the hose 128, the termination attachment 106 may be attached to an opposing end of the ferrule 104. The termination attachment 106 may be associated with an end termination 200, by welding, integrally machining, or other fabrication techniques, before attachment to the fitting 107. The termination attachment 106 may be threadably received within the second collar portion 160 of the ferrule 104 until sufficient engagement of the internal thread 190 of the ferrule 104 and the external thread 206 of the termination attachment 106, which may be indicated by axial alignment of the marking 216 of the termination attachment 106 with the end face 194 of the ferrule 104. The threaded engagement of the termination attachment 106 and the ferrule 104 may form a fluid-tight interface between the inner surface 208 of the termination attachment 106 and the outer surface 140 of the stem 102 via the sealing element 150, as well as between the tapered surface 147 of the stem 102 and the tapered surface 211 of the termination attachment 106.

After the termination attachment 106 is attached to the ferrule 104 and sealed against the stem 102, the termination attachment 106 may be axially locked to the ferrule 104 to prevent unthreading of the termination attachment 106 relative to the ferrule 104. Upon axial alignment of the through-holes 192 of the second collar portion 160 of the ferrule 104 with the annular locking groove 222 of the termination attachment 106, one or more set screws 215 (see FIG. 8, for example) may be rotated within the internally-threaded through-holes 192 to radially insert a portion of the set screws 215 within the annular locking groove 222 to obstruct axial movement of the termination attachment 106 relative to the ferrule 104 and thus the stem 102.

The ferrule 104, the termination attachment 106, or both may include knurling or similar surface modification, which may enhance gripping and turning of the ferrule 104, the termination attachment 106, or both, especially during hand tightening. The ferrule 104, the termination attachment 106, or both may include engagement or wrenching adaptations such as a hex, holes, slots, flats, or orifices, which are capable of receiving a wrench or other tool used to tighten/loosen and/or generally apply torque to the ferrule 104, the termination attachment 106, or both during assembly of the hose coupling 100.

Figure 6:
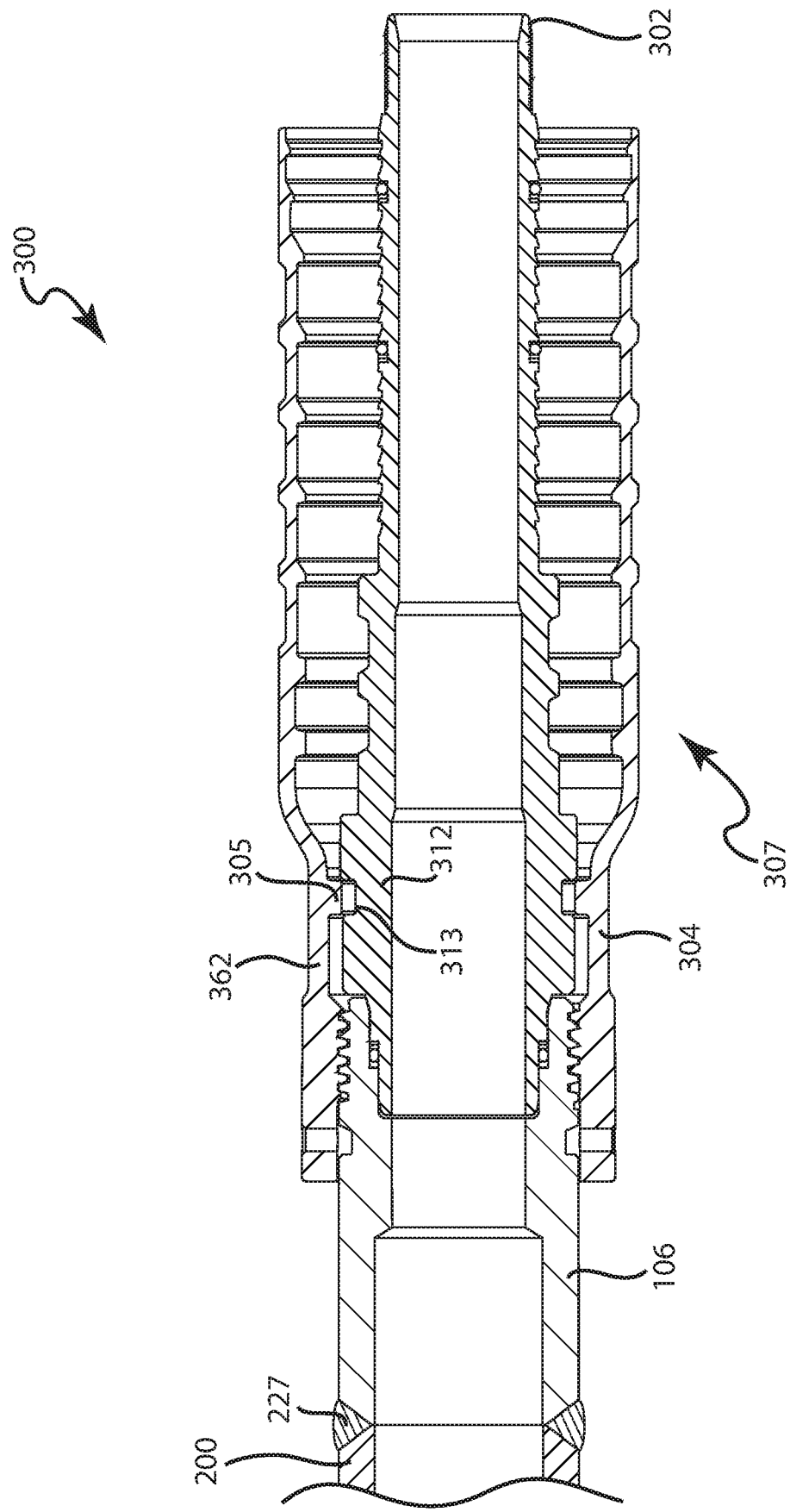
FIG. 6 is a longitudinal cross-section view of another example hose coupling in accordance with some examples of the present disclosure.

With the exception of the intermediate portion 112 of the stem 102 and the intermediate portion 162 of the ferrule 104 illustrated in FIGS. 1-5, the coupling 300 illustrated in FIG. 6 has the same features and operation as the coupling 100. Accordingly, the preceding discussion of the features and operation of the coupling 100 illustrated in FIGS. 1-5 should be considered equally applicable to the coupling 300 illustrated in FIG. 6, except as noted in the following discussion pertaining to the attachment of the ferrule 304 to the stem 302. The reference numerals used in FIG. 6 generally correspond to the reference numerals used in FIGS. 1-5 to reflect similar parts and attachments, except the first digit of each reference numeral associated with a modified part or feature is incremented by two.

Referring to FIG. 6, the intermediate portion 362 of the ferrule 304 of the hose coupling 300 may be staked onto the intermediate portion 312 of the stem 302 to attach the ferrule 304 to the stem 302 and promote proper alignment between the corresponding features of the ferrule 304 and the stem 302. The intermediate portion 362 of the ferrule 304 may include an internal, annular ridge 305, and the intermediate portion 312 of the stem 302 may include a corresponding annular-receiving groove 313. To attach the ferrule 304 to the stem 302, the annular ridge 305 may be staked into the annular groove 313. Staking the ferrule 304 to the stem 302 may eliminate the need to weld the ferrule 304 to the stem 302 or perform special heat treating, which may corrode the fitting 307.

Referring to FIG. 7, the preceding discussion of the features and operation of the couplings 100, 300 illustrated in FIGS. 1-6 should be considered equally applicable to the coupling 400 illustrated in FIG. 7, except as noted in the following discussion pertaining to the metal-to-metal seal between the stem 402 and the termination attachment 406. The reference numerals used in FIG. 7 generally correspond to the reference numerals used in FIGS. 1-6 to reflect similar parts and attachments, except the first digit of each reference numeral associated with a modified part or feature is incremented by three relative to FIGS. 1-5 and by one relative to FIG. 6. For example, ferrule 404 in FIG. 7 generally corresponds to ferrule 104 in FIGS. 1-5 and ferrule 304 in FIG. 6.

With continued reference to FIG. 7, a metal-to-metal seal 449 between the termination attachment 406 and the stem 402 may be formed forwardly of sealing element 450, which may be disposed forwardly of the shoulder 446. The metal-to-metal seal 449 may be defined by a fluid-tight interface between an angled or tapered surface 411 of the termination attachment 406 and an angled or tapered surface 447 of the stem 402. The metal-to-metal seal 449 may be formed at a smaller diameter relative to the metal-to-metal seal 149 of the coupling 100.

Figure 8:
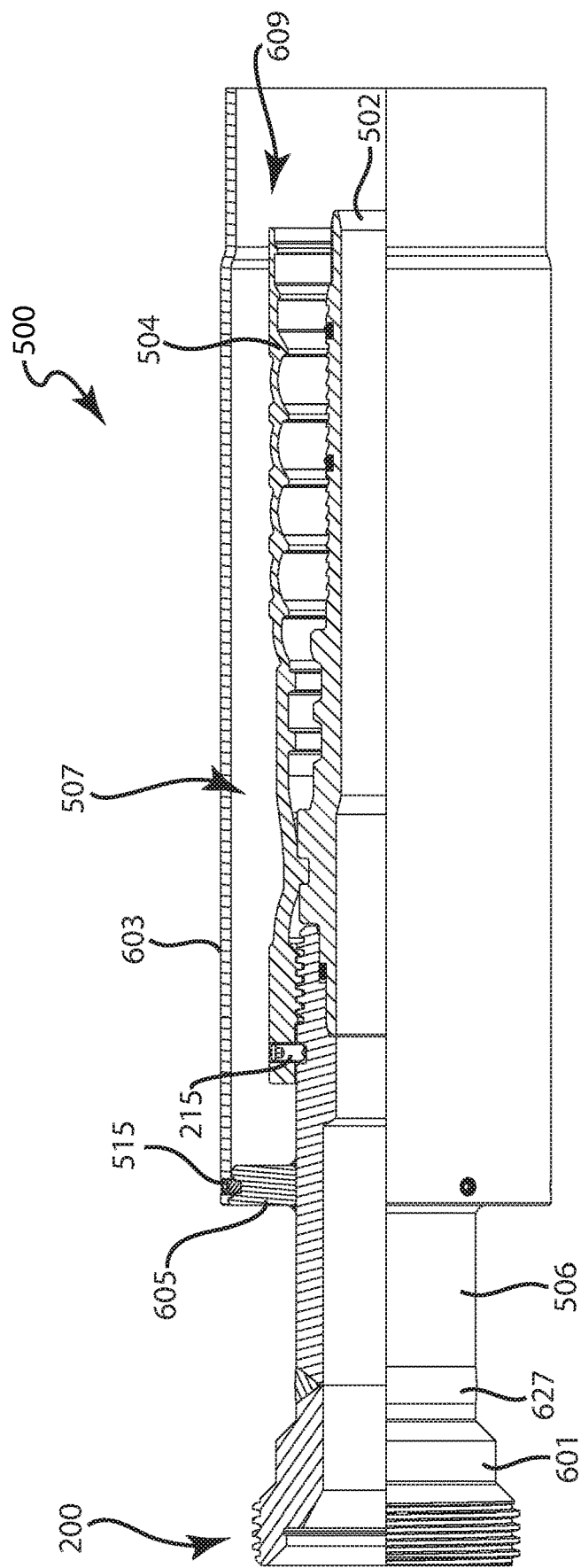
FIG. 8 is a longitudinal cross-section view of another example hose coupling in accordance with some examples of the present disclosure.

Referring to FIG. 8, the preceding discussion of the features and operation of the couplings illustrated in FIGS. 1-7 should be considered equally applicable to the coupling 500 illustrated in FIG. 8, except as noted in the following discussion pertaining to the termination attachment 506 and the end termination 200. The reference numerals used in FIG. 8 generally correspond to the reference numerals used in FIGS. 1-7 to reflect similar parts and attachments, except the first digit of each reference numeral associated with a modified part or feature is incremented by four relative to FIGS. 1-5.

With continued reference to FIG. 8, the coupling 500 may include a stem 502, a ferrule 504 staked to the stem 502, a termination attachment 506 in sealing engagement with the stem 502 and in threaded engagement with the ferrule 504, and an end termination 200 permanently attached to the termination attachment 506 by a weld 627. The end termination 200 may be externally or internally threaded at a terminal end opposite the termination attachment 506 and may be referred to as a stud end 601.

With continued reference to FIG. 8, the coupling 500 may include a second or over-ferrule 603 attached to the termination attachment 506. The over-ferrule 603 may surround the fitting 507 and protect the fitting 507 from external damage. The over-ferrule 603 may extend axially over the ferrule 504 of the fitting 507, may be arranged concentrically about the ferrule 504, and may be spaced radially outwardly of the ferrule 504. Although not shown in FIG. 8, a protective armor may be disposed radially between the ferrule 504 and the over-ferrule 603, which may secure the protective armor to the end portion of the hose. The protective armor may surround the exterior surface of the hose and may extend along a substantial portion of the length of the hose. The protective armor may protect the hose and an insulation layer covering the hose. The protective armor may be constructed of stainless steel and may be formed in a spiral, flexible configuration.

Referring still to FIG. 8, an annular plate 605 may be attached to the termination attachment 506 axially between the end termination 200 and the ferrule 504. An inner surface of the annular plate 605 may be mounted onto an outer surface of the termination attachment 506 and secured in place by a weld, for example. The annular plate 605 may be welded to the termination attachment 506 prior to attachment of the termination attachment 506 to the fitting 507. One end of the second ferrule 603 may be attached to an outer surface of the annular plate 605, and the opposite end of the second ferrule 603 may be disposed about an exposed portion of the hose. The second ferrule 603 may be attached to the annular plate 605 by one or more fasteners 515, such as set screws. In this configuration, an annular space 609 defined between the second ferrule 603 and the ferrule 504 may be closed at one end by the annular plate 605 and may be open at an opposite end. The termination attachment 506 may be longer than the termination attachments 106, 406, 506 shown in FIGS. 1-7 to provide more surface area for attachment of the annular plate 605 to the termination attachment 506. As should be appreciated, the second ferrule 603, the annular plate 605, or both may be used with the couplings shown in FIGS. 1-7.

Figure 9:
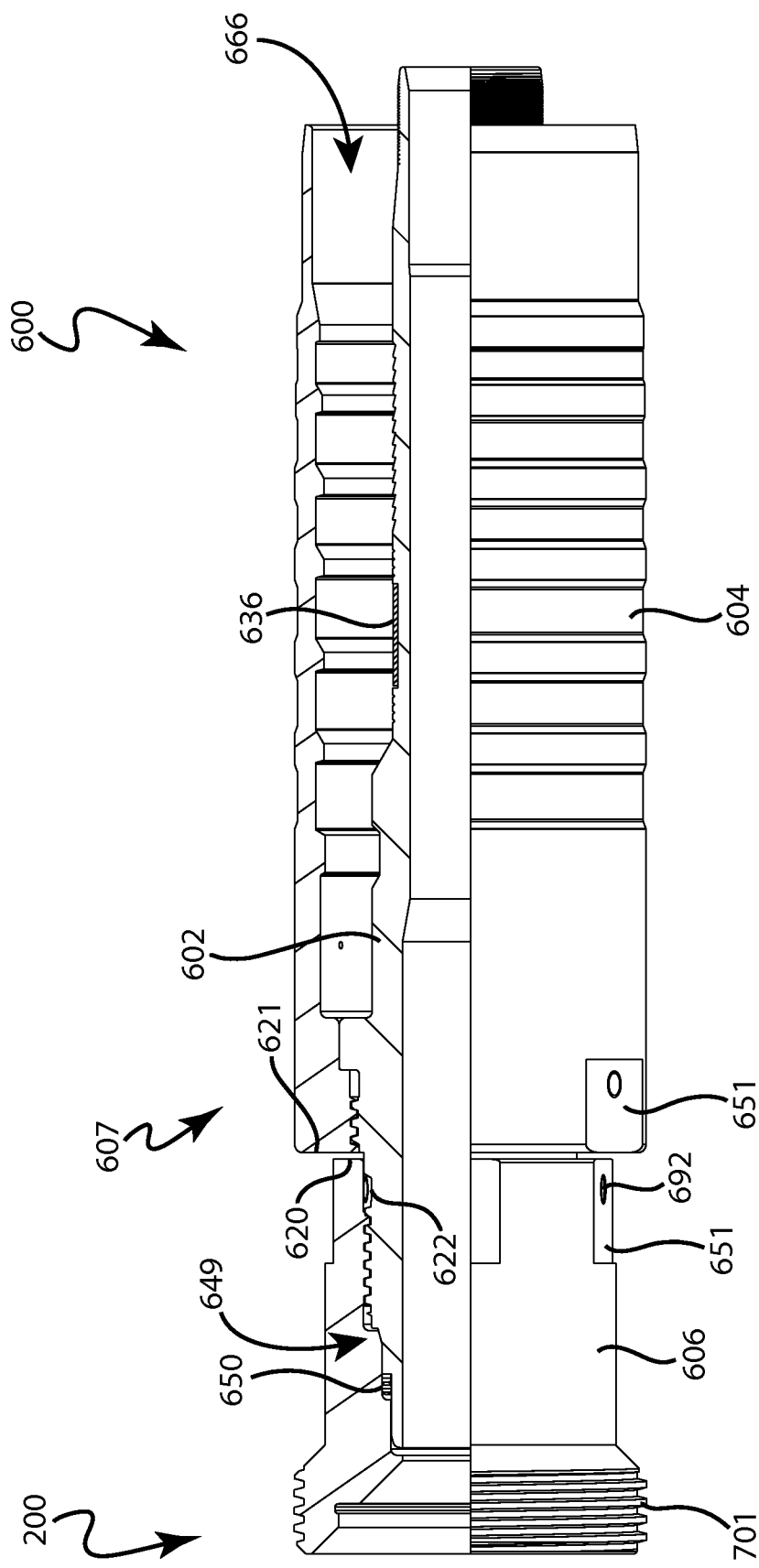
FIG. 9 is a longitudinal cross-section view of another example hose coupling in accordance with some examples of the present disclosure.

Referring to FIG. 9, the preceding discussion of the features and operation of the couplings illustrated in FIGS. 1-8 should be considered equally applicable to the coupling 600 illustrated in FIG. 9, except as noted in the following discussion pertaining to the termination attachment 606 and the fitting 607. The reference numerals used in FIG. 9 generally correspond to the reference numerals used in FIGS. 1-8 to reflect similar parts and attachments, except the first digit of each reference numeral associated with a modified part or feature is incremented by five relative to FIGS. 1-5.

With continued reference to FIG. 9, the coupling 600 may include a stem 602, a ferrule 604, a termination attachment 606, and an end termination 200. The ferrule 604 may be attached to the stem 602 and define an annular space 666 between the ferrule 604 and the stem 602 configured to receive an end portion of a hose. The termination attachment 606 may be attached to the stem 602 in opposing relationship to the ferrule 604. The end termination 200 may be integrally-machined with the termination attachment 606. The end termination 200 may be externally threaded at a terminal end opposite the termination attachment 606 and may be referred to as a stud end 701.

Referring still to FIG. 9, the termination attachment 606 may threaded onto the stem 602. The termination attachment 606 may include an internal thread for threaded engagement with an external thread of the stem 602 to attach the end termination 200 to the fitting 607. The termination attachment 606 and the stem 602 may include corresponding locking features to prevent the termination attachment 606 from unthreading from the fitting 607. The locking feature of the stem 602 may include an annular locking groove 622, and the locking feature of the termination attachment 606 may include one or more through-holes 692 that may be axially aligned with the annular locking groove 622 upon sealing engagement between the termination attachment 606 and the stem 602. One or more set screws (see set screws 215 in FIG. 8, for example) may be threadably received in the through-holes 692 of the termination attachment 606 and may protrude into the annular locking groove 622 of the stem 602 to prevent or substantially prevent rotation of the termination attachment 606 relative to the stem 602.

With continued reference to FIG. 9, the termination attachment 606 may form a fluid-tight interface with the stem 602. The interface between the termination attachment 606 and the stem 602 may provide two fluid-tight seals: a first seal formed by a sealing element 650, and a second, metal-to-metal seal 649 axially offset from the sealing element 650. As shown in FIG. 9, the metal-to-metal seal 649 may be formed axially inward of the sealing element 650 and axially outward of the threaded engagement between the termination attachment 606 and the stem 602. Another sealing element 636 may be seated onto the stem 602 radially inwardly of the ferrule 604 to sealingly engage an inner surface of a hose.

The ferrule 604, the termination attachment 606, or both may include knurling or similar surface modification, which may enhance gripping and turning of the ferrule 604, the termination attachment 606, or both. The ferrule 604, the termination attachment 606, or both may include engagement or wrenching adaptations 651 such as a hex, holes, slots, flats, or orifices, which are capable of receiving a wrench or other tool used to tighten/loosen and/or generally apply torque to the ferrule 604, the termination attachment 606, or both during assembly of the hose coupling 600. Although not shown in FIG. 9, the coupling 600 may include an insertion marking to indicate the termination attachment 606 is fully engaged with the stem 602. In some examples, an insertion marking is formed on the outer surface of the stem 602, and axial alignment of the leading end face 620 of the termination attachment 606 with the insertion marking indicates a proper sealed engagement between the termination attachment 606 and the stem 602. The axial distance between the opposing end faces 620, 621 of the termination attachment 606 and the ferrule 604, respectively, may be increased by lengthening the stem 602, for example, to facilitate viewing of the insertion marking on the stem 602.

The provided hose coupling may overcome many issues of other hose couplings, such as risk of heat damage and time-consuming removal of dies during attachment of the hose coupling to an end portion of a hose. The provided hose coupling may provide a reliable way to add a wide variety of end terminations to a single hose-end fitting design. For large, heavy end terminations, crimping or swaging operations may be completed with lighter, easier to manage couplings, without the necessity of removing dies to remove the couplings from the equipment. If welding is required for an end termination, the welding operation may be performed in a simple, separate process, without concern for overheating the hose. In other words, the termination attachment may be associated with an end termination prior to attaching the termination attachment to a hose via the hose-end fitting.

In some implementations, the provided hose coupling may include recesses in the ferrule that reduce crimping force and ferrule growth, because the mid-recess material may not move as far as the end-recess material, leading to a rounded appearance after crimping. The multiple diameter external contour of the ferrule may be particularly suitable for crimping. In some applications for plastic-lined hoses, the stem of the provided hose coupling may include several advantageous features. In some examples, the hose coupling includes relatively sharp-edged, tapered barbs that grip the plastic and resist flow of the plastic at high temperatures and pressures. In some examples, one or more seals keep the conveyed medium from escaping between the stem and the hose. This may be particularly helpful in the event that compression is reduced between the hose and the stem with exposure to heat and pressure.

In some implementations, the hose coupling may include a region where the reinforcement layer of the hose is gripped both internally and externally. The region may include offset ridges on the stem and ferrule to create a multiple bite engagement. In some implementations, a termination attachment feature allows any of a number of hose terminations to be attached to the fitting after the fitting is attached to the hose, enabling the fitting to readily utilize a broad variety of end terminations. The termination attachment feature may reduce the weight of the fitting, facilitate handling during attachment of the fitting to the hose, and permit removal of the hose assembly from the attachment equipment without removing dies.

The foregoing description has broad application. The hose coupling may be used in high-pressure applications with, but not limited to, 3-4" hose, which may be rubber or plastic. The termination attachment may be a nipple or other tubular structure, which may be welded, integrally machined, or otherwise associated with a desired end termination such that users may attach any desired end termination to the termination attachment, providing robustness to the hose coupling, especially in field applications. The termination attachment may include an internal or external thread, and the ferrule or the stem may include an internal or external mating thread. The termination attachment and the stem may form a seal, which may be internal or external to either the termination attachment or the stem. The seal may be formed by a sealing element, which may be captured by a groove in the termination attachment or the stem or may be captured between shoulders of the termination attachment and the stem. The discussion of any example is meant only to be explanatory and is not intended to suggest that the scope of the disclosure, including the claims, is limited to these examples. In other words, while illustrative examples of the disclosure have been described in detail herein, it is to be understood that the inventive concepts may be otherwise variously embodied and employed, and that the appended claims are intended to be construed to include such variations, except as limited by the prior art. For instance, the termination attachment may be externally and/or internally threaded. In some examples, the termination attachment may have a female or internal thread configured to threadably engage a male or external thread of the stem to attach the termination attachment to the fitting.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

What is claimed is:

1. A hose coupling for attachment to an end portion of a hose, the hose coupling comprising:
    a fitting attachable to the end portion of the hose, the fitting comprising a ferrule and a stem including a first end portion insertable into an end portion of a hose, the ferrule attached to the stem;
    a termination attachment attached to the fitting in opposing relationship to the end portion of the hose; and
    an end termination associated with the termination attachment;
    wherein the termination attachment forms a fluid-tight interface with the stem;
    wherein the fluid-tight interface comprises:
    a first seal formed by a sealing element sealed against opposing surfaces of the stem and the termination attachment; and
    a second seal formed between opposing tapered surfaces of the stem and the termination attachment;
    wherein the termination attachment and the ferrule include corresponding locking features to prevent the termination attachment from unthreading from the fitting;
    wherein the stem includes a second sealing element arranged about the first end portion of the stem; and
    wherein the ferrule includes a first collar portion disposed about the first end portion and defining an annular space between the first end portion and the first collar portion;
    wherein the first end portion of the stem includes a series of external, annular barbs spaced axially apart from one another; and
    the second sealing element is positioned axially between consecutive barbs of the series of external, annular barbs.

2. The hose coupling of claim 1 wherein the first collar portion includes an annular, internal serration that is positioned axially inward of the second sealing element to facilitate a fluid-tight interface between the second sealing element and the end portion of the hose.

3. The hose coupling of claim 2 wherein the annular, internal serration is axially separated from an adjacent annular, internal serration by a cylindrical segment, and the second sealing element is positioned axially between the annular, internal serration and the adjacent annular, internal serration.

4. The hose coupling of claim 3 wherein:
    the cylindrical segment is formed as a recess in the outer surface of the ferrule.

5. The hose coupling of claim 4 wherein the cylindrical segment is located axially between external ridges on the ferrule.

6. The hose coupling of claim 1 wherein the termination attachment is in threaded engagement with the fitting by means of external threads on the termination attachment which mate with internal threads on the ferrule.

7. The hose coupling of claim 1 wherein the tapered surfaces are axially offset from the sealing element.

8. The hose coupling of claim 7 wherein the termination attachment is in threaded engagement with the fitting.

9. The hose coupling of claim 1 wherein:
    the locking feature of the termination attachment comprises an annular locking groove;
    the locking feature of the ferrule comprises one or more through-holes axially aligned with the annular locking groove; and
    one or more set screws are received in the through-holes and protrude into the annular locking groove.

10. The hose coupling of claim 1 wherein the end termination is welded to the termination attachment.

11. The hose coupling of claim 10 wherein the termination attachment comprises a tubular structure that is threaded at one end and chamfered at an opposing end.

12. The hose coupling of claim 1 further comprising a second ferrule attached to the termination attachment.

13. The hose coupling of claim 12 wherein the second ferrule extends axially over the ferrule and is spaced radially outwardly of the ferrule.

14. A hose assembly comprising:
    a hose comprising:
        an inner tube;
        a cable reinforcement layer surrounding the inner tube; and
        a cover layer surrounding the cable reinforcement layer; and
    the coupling of claim 12 crimped or swaged on an end portion of the hose.

15. The hose assembly of claim 14 wherein the termination attachment is in threaded engagement with the ferrule.

16. The hose assembly of claim 14 wherein the ferrule includes an internal serration positioned axially inward of the second sealing element to facilitate a fluid-tight interface between the second sealing element and the inner surface of the inner tube.

17. The hose assembly of claim 14 wherein the end termination is welded to the termination attachment.

18. The hose assembly of claim 14 wherein the inner tube is at least partially skived along the end portion of the hose.

19. The hose assembly of claim 18 wherein the cover layer is at least partially skived along the end portion of the hose.

20. A method of attaching the hose coupling of claim 1 to a hose, the method comprising:
- inserting an end portion of a hose into the annular space defined between the ferrule and the stem;
- radially constricting the annular space to attach the fitting to the end portion of the hose; and
- after attaching the fitting to the end portion of the hose, threadably engaging the termination attachment to the fitting in opposing relationship to the end portion of the hose.

21. The method of claim 20 further comprising forming the fluid-tight interface between opposing surfaces of the termination attachment and the stem during the threaded engagement of the termination attachment to the fitting.

22. The method of claim 20 further comprising rotating the termination attachment relative to the fitting until a marking on an outer surface of the termination attachment is aligned with an end face of the ferrule.

23. The method of claim 20 wherein radially constricting the annular space compresses the second sealing element disposed about the stem against an inner surface of the hose to form a fluid-tight interface between the sealing element and the hose.

24. The method of claim 20 further comprising axially locking the termination attachment to the fitting to prevent unthreading of the termination attachment from the fitting.

* * * * *